(12) United States Patent
de la Torre Bueno

(10) Patent No.: US 7,958,958 B2
(45) Date of Patent: Jun. 14, 2011

(54) INPUTS FOR OPTIMIZING PERFORMANCE IN HYBRID VEHICLES

(75) Inventor: Jose de la Torre Bueno, Vista, CA (US)

(73) Assignees: Jose de la Torre-Bueno, Rancho Santa Fe, CA (US); Law Office of Scott C. Harris, Rancho Santa Fe, CA (US)

( * ) Notice: Subject to any disclaimer, the term of this patent is extended or adjusted under 35 U.S.C. 154(b) by 0 days.

(21) Appl. No.: 12/710,350

(22) Filed: Feb. 22, 2010

(65) Prior Publication Data
US 2010/0217467 A1 Aug. 26, 2010

Related U.S. Application Data

(62) Division of application No. 11/450,049, filed on Jun. 9, 2006, now Pat. No. 7,665,559.

(60) Provisional application No. 60/639,689, filed on Jun. 20, 2005.

(51) Int. Cl.
*B60W 10/26* (2006.01)

(52) U.S. Cl. .................. 180/65.29; 180/167; 701/213

(58) Field of Classification Search ............ 180/65.29, 180/65.31, 65.27, 167; 701/22, 25, 202, 701/213
See application file for complete search history.

(56) References Cited

U.S. PATENT DOCUMENTS

| | | | | |
|---|---|---|---|---|
| 5,778,326 A | * | 7/1998 | Moroto et al. | 701/22 |
| 5,832,396 A | * | 11/1998 | Moroto et al. | 701/22 |
| 6,445,308 B1 | * | 9/2002 | Koike | 340/902 |
| 6,487,477 B1 | * | 11/2002 | Woestman et al. | 701/22 |
| 6,687,607 B2 | * | 2/2004 | Graf et al. | 701/202 |
| 6,697,717 B2 | * | 2/2004 | Shioda et al. | 701/22 |
| 6,814,170 B2 | * | 11/2004 | Abe et al. | 180/65.25 |
| 6,856,866 B2 | * | 2/2005 | Nakao | 701/22 |
| 6,861,957 B2 | * | 3/2005 | Koike | 340/903 |
| 6,986,398 B2 | * | 1/2006 | Obayashi | 180/65.28 |
| 7,360,615 B2 | * | 4/2008 | Salman et al. | 180/65.265 |
| 7,665,559 B2 | * | 2/2010 | De La Torre-Bueno | 180/65.29 |
| 2002/0188387 A1 | * | 12/2002 | Woestman et al. | 701/22 |
| 2003/0173123 A1 | * | 9/2003 | Nakanowatari | 180/65.2 |
| 2006/0278449 A1 | * | 12/2006 | De La Torre-Bueno | 180/65.2 |
| 2009/0114463 A1 | * | 5/2009 | DeVault | 180/65.29 |
| 2010/0121590 A1 | * | 5/2010 | Kato | 702/63 |
| 2010/0185384 A1 | * | 7/2010 | Naito et al. | 701/200 |
| 2010/0188043 A1 | * | 7/2010 | Kelty et al. | 320/109 |

* cited by examiner

Primary Examiner — Jeffrey J Restifo

(57) ABSTRACT

A hybrid vehicle controller operates to use GPS navigation information to determine how much energy should be delivered from or sent to, the battery. The battery charge can be better managed by using knowledge of the future path of the vehicle.

3 Claims, 3 Drawing Sheets

INPUTS FOR OPTIMIZING PERFORMANCE IN HYBRID VEHICLES

CROSS-REFERENCE TO RELATED APPLICATIONS

This application claims priority to U.S. Application Ser. No. 60/689,639, filed on Jun. 20, 2005. The disclosure of the prior application is considered part of (and is incorporated by reference in) the disclosure of this application.

BACKGROUND

A hybrid vehicle may operate using both hydrocarbon fuel and electric power. A conventional engine may be fueled by the hydrocarbon fuel. An electric motor is powered by a battery, and can create or supplement the engine's power. There are several levels of hybrid vehicles available or in design. Some definitions:

Basic hybrids will be used to refer to the current generation of hybrid vehicles in which the amount of energy stored as liquid fuel is much greater than the energy capacity of the battery so the vehicle is being propelled by the engine most of the time. The vehicle uses the combined power of both the engine and the motor to achieve acceptable performance in acceleration or hill climbing. Performance may suffer if the battery is completely drained.

A basic hybrid may use the engine to operate a generator which charges the battery at times when the full power of the engine is not needed to propel the vehicle. During braking the electric motor can also act as a generator and recover kinetic energy to replenish the battery.

Pure hybrids or serial hybrids refer to more extreme hybrid vehicles that are being designed. In these "pure" or all-electric-drive hybrids, one or more electric motors are the only source of power to the wheels. The only function of the engine is to run a generator to charge the battery. In this type of vehicle it is even more important that there always be charge in the battery since the vehicle cannot move at all without it.

In a pure hybrid the battery pack is typically much larger than in a basic hybrid. This design also has the advantage that the engine and generator can run while the vehicle is parked or stopped. Because most vehicles spend more time parked than moving in this kind of hybrid the engine can be much smaller than the engine in a conventional vehicle of the same weight.

Plug-in hybrid means one in which the driver has the option of plugging the vehicle into an exterior electric power when it is parked so that the battery does not have to be charged by the engine. Typically they have larger batteries than a basic hybrid. Of course if the battery is low and the vehicle is not plugged in the engine will power a generator to charge the battery as in a basic hybrid. Since electricity purchased from a utility is much cheaper than hydrocarbon fuels in terms of cost per unit of energy, it is advantageous to the user to charge from the grid as often as possible and minimize times the engine is charging the battery.

A plug-in hybrid often has a larger battery, so that on local trips the vehicle may be able to run on battery power except when maximal power is needed and thus achieve a higher effective miles per gallon of hydrocarbon fuel. The capacity to plug in is a feature that can be added to the other types mentioned above so a plug-in hybrid will also be either a basic or pure hybrid.

Solar hybrid will be used to refer to newly proposed hybrid vehicles which have solar panels on the body to provide part of the electricity for the electric motor. It is well known that the area available on the top of a typical car is insufficient to provide enough electricity to power the car. In fact, typically the ratio is $1/8$ to $1/10$ of the area that would be needed to power such a vehicle. On the other hand, a typical car belonging to an individual is parked 90% of the time. Therefore, if the battery is large enough, solar charging could provide a significant portion of the energy used. The currently proposed solar hybrids may also be plug-in hybrids, so if sunlight is unavailable for any reason (weather, parked underground etc.) the battery can be charged from grid power. In addition since it is a hybrid, the battery can always be charged by the engine.

A controller may be formed by one or more processors associated with the vehicle. The controller runs an optimized control algorithm that determines on a moment-to-moment basis when to use either the engine, the motor or both; in what ratio, and also when to charge the battery from the engine. In pure, plug-in and solar hybrids, the controller also makes decisions about how and when to recharge the battery when the vehicle is stopped or parked. The controller may also adjust the transmission and brakes as necessary to maintain optimal efficiency.

SUMMARY

The present application describes new ways of controlling a hybrid vehicles to increase the degree of optimization possible.

DETAILED DESCRIPTION

Figure 1:
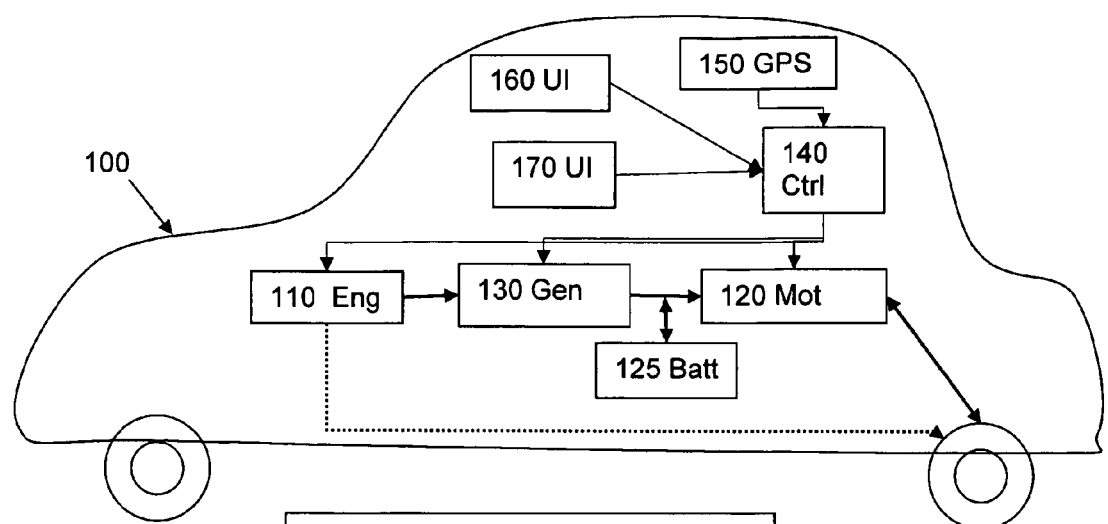
FIG. 1 shows a basic hybrid vehicle.

An embodiment as shown in FIG. 1. A hybrid vehicle 100 is shown as an automobile with an engine 110 running on a combustible fuel, e.g., gasoline, and a motor 120, powered by a rechargeable source (here a battery) 125. A generator 130 produces energy to charge the battery, regeneratively or with power from the motor. Note that in some designs the generator and the motor may be the same device. A controller 140 determines how much engine power and/or motor power to use.

Existing designs may use various parameters, including the current and previous position of the gas pedal and brake pedal (which input the driver's intent to the controller), the current and past fuel consumption, the current and past speed and acceleration, and battery charge level as inputs. Note that the "gas pedal" is not actually controlling the fuel pump in some hybrid vehicles, but is taken by the controller as an indication of the driver's desire. Based on this information and the other variables, the controller 140 may control the fuel flow to engine 110, as well as the amount of current delivered to the electric motor 120. The controller may also take other actions, such as shifting the continuously variable transmission.

Other variables may also be used to help the controller 140 in making its decision. These may include the slope of the road, the current temperature and the current air pressure. Variables such as these may form second order influences on the optimization carried out by the controller.

Figure 2:
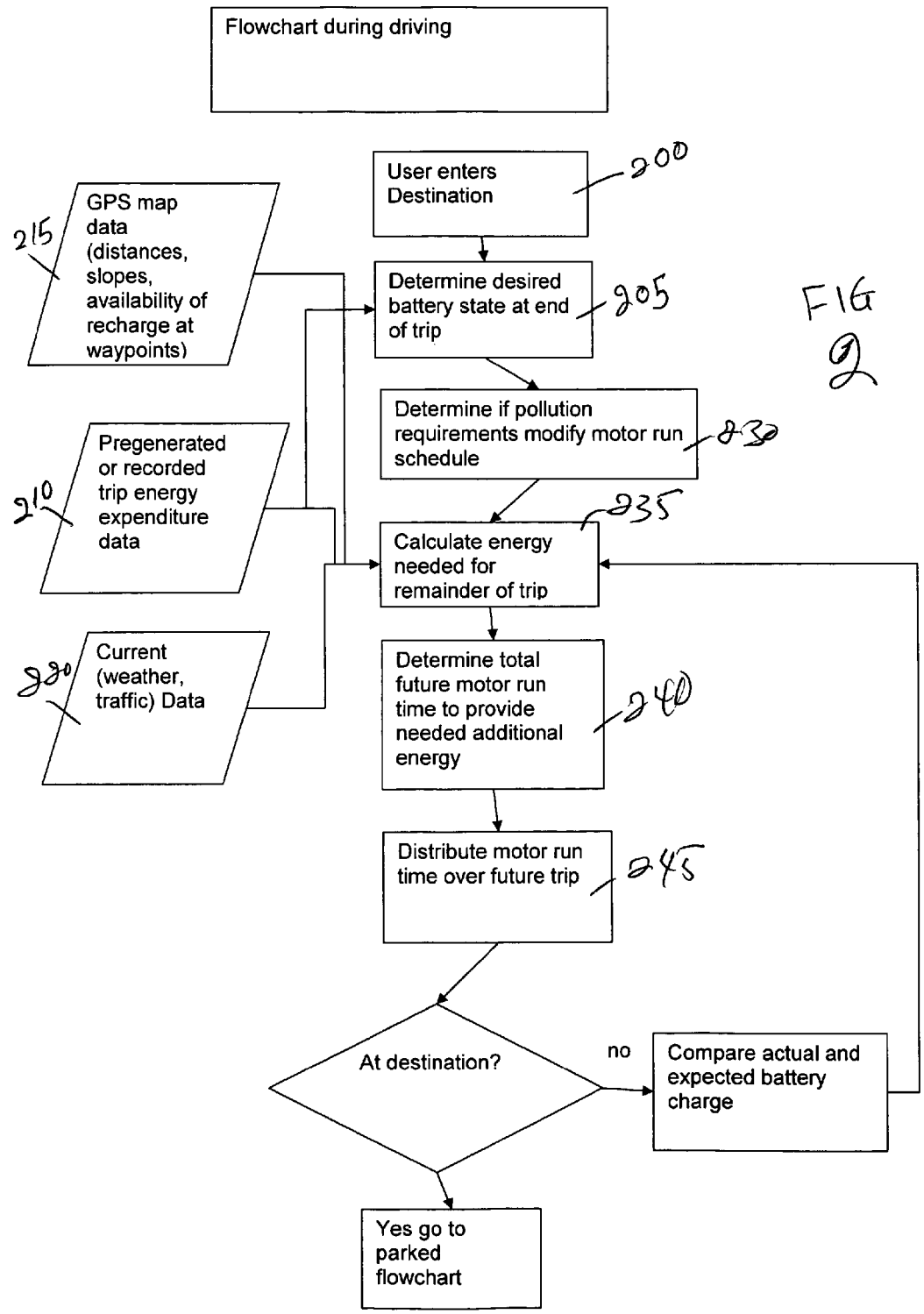
FIGS. 2 and 3 show a flowchart of operation.
Figure 3:
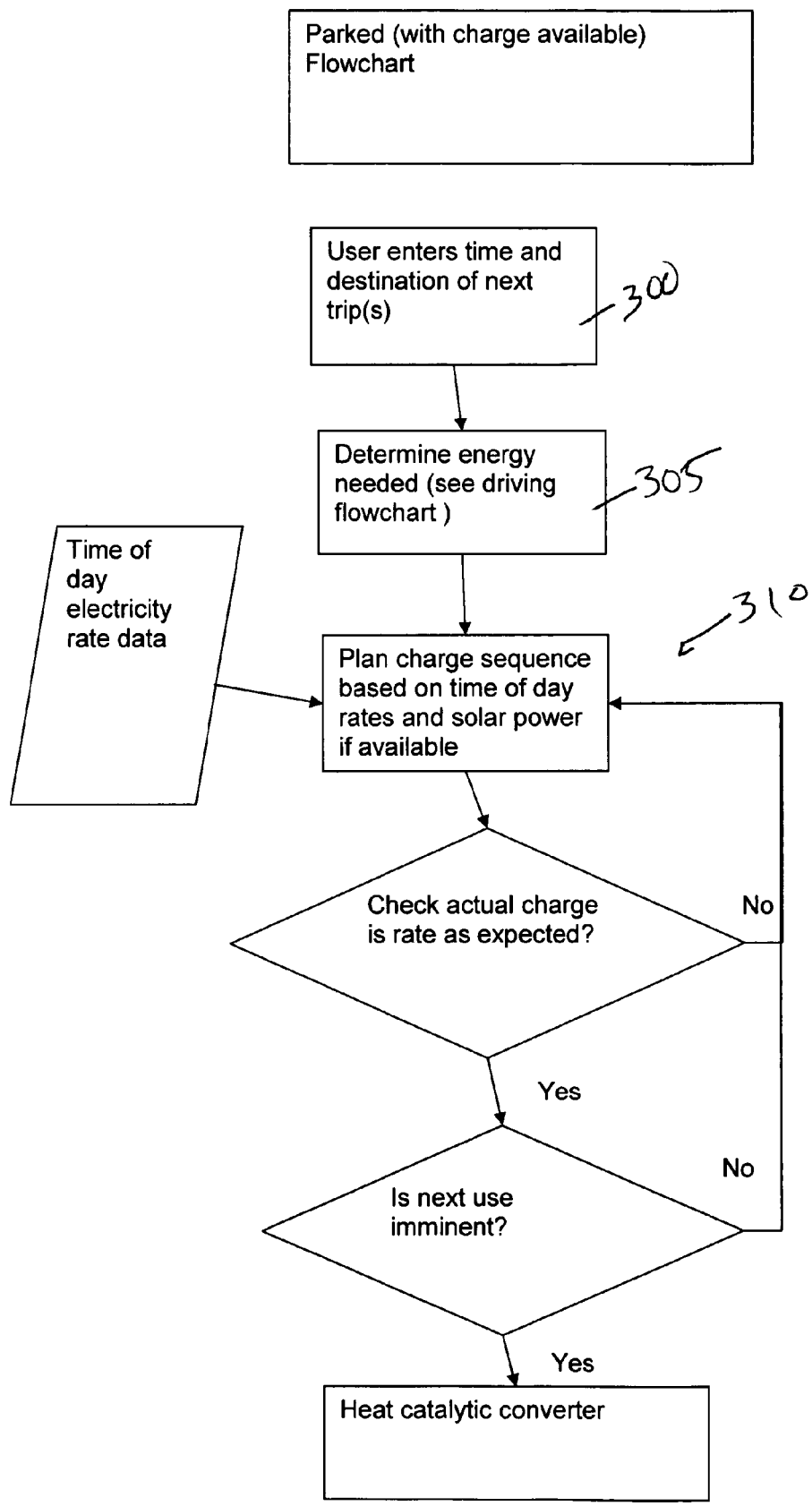

The controller 140 operates according to the flowchart of FIGS. 2 and 3, to determine when to use battery charge, and how much to use. The controller's goal is to use as much of the battery charge as possible—while never really completely emptying the battery charge.

Consider the decision the controller must make if a hybrid vehicle has climbed a hill steep and long enough that the battery had to be significantly drained to achieve the driver's desired speed. If the vehicle then reaches a level stretch, the controller will detect a need to replenish the battery and will aggressively charge the battery. For example, the controller may run the conventional engine at a level greater than needed to maintain speed in order to have extra power to recharge the battery. Note that this action is triggered by a rule, perhaps the cardinal rule in the controller which dictates that "if the battery is below a certain charge level and the current power requirement is less than the capacity of the conventional engine, then recharge the battery."

The inventor recognized, however, that recharging the battery at this moment may or may not be the optimum action in terms of fuel economy. If there is another hill coming up, it may be the correct action—otherwise if the battery is not fully charged by the start of the next hill, the vehicle may not be able to climb that at an acceptable speed without the additional energy from the battery. In contrast, if the route is going to go downhill next, the system will have the option of using the electric motor as a brake and recovering energy into the battery for future use. The previous aggressive charging might not have been necessary. Once the battery has been fully charged, the recovered energy is essentially wasted—the controller will have to use the mechanical brake to control the downhill speed and the energy will be lost as heat instead.

The inventor noticed that this less-than-optimum decision by the controller algorithm is caused because the controller does not use knowledge of the future path of the vehicle. If there were an input to inform the algorithm of future opportunities to recharge the battery, then a more optimum sequence could be chosen and the net efficiency could improve.

In an embodiment, the controller 110 uses knowledge of the future path of the vehicle as part of its determination of how much battery charge to use at any given time. In an embodiment, the future path is determined from a GPS navigator 150 associated with the vehicle, that communicates with (or is part of) controller 140. In another embodiment, the user manually tells the controller about the trip that is going to be taken. This is generically shown as the "trip energy expenditure data", 210 in FIG. 2. The controller may determine this based on GPS map data 215, as well as based on dynamic information 220, such as weather and traffic.

In a plug-in hybrid, the problem of the controller not knowing the drivers intent is exacerbated. In proposed designs for plug in hybrids, the suggested algorithm is to use the engine to recharge the battery whenever the battery level is below 40%. This is a safe algorithm but clearly not the most cost efficient possible. Consider the situation in which the driver is on their way to a parking place where grid electricity is available. In this case, letting the battery be run to almost zero as the vehicle arrives is a good strategy; since it will allow the maximum amount of energy to be obtained and stored at the lower cost—since electricity is almost always cheaper per unit energy than liquid fuels. Under the 40% rule, the controller might be running the engine harder than necessary in order to charge the battery when it is in fact possible to charge the battery from a cheaper source at the destination.

An embodiment describes informing the controller of how far the vehicle must go (as well as the speed and any hills to be climbed) before grid recharging is available. Given this information, the control algorithm becomes able to calculate the energy needed to complete the trip in order to use as much as possible of the energy in the battery so that it could be recharged from the less expensive source.

Another aspect provides information for the controller to know how long grid power is going to be available and how much energy is needed for the next trip.

If time of day metering is available at charging locations, a further cost optimization is possible in plug-in hybrids. Consider the case in which the driver has arrived home and plugged in the vehicle. Should the controller recharge the battery as fast as possible? If the driver intends to use the vehicle again soon, this could be the desired behavior. However, if the vehicle will not be used until the next day and cheaper electricity is available at night, then it might be better to delay recharging until the electricity rate comes down. In the absence of information on when and how the vehicle will next be used, the designer of the algorithm must make pessimistic assumptions which will lead the algorithm to charge the battery as quickly as possible regardless of cost.

This issue of when and from what source to charge the battery is even more complex in a solar hybrid. Consider the scenario in which the driver has commuted to work and parked the vehicle at a spot that has grid power available. Obviously the driver should plug in the vehicle but should the controller begin to draw grid power? Given enough time, the solar hybrid can recharge the battery from the solar collectors on the vehicle but what if the driver intends to make another trip soon? If the battery is not recharged, the next trip will at the least use more engine time and therefore more expensive fuel. Again lack of knowledge of the driver's future intent forces the designer of the control algorithm to make pessimistic assumptions.

The driver's intent and the vehicle's future path are often available in computer compatible form when the driver is using a GPS navigator. In addition to knowing the current position, a modern GPS stores a map of the area which optionally can include contour information. In order to use the navigation assistance feature of a GPS, the driver indicates the destination at the start of the trip, shown as 200 in FIG. 2. The controller determines the desired end battery state at 205. This may be a set amount, or may be controllable.

In an embodiment, the GPS provides information indicative of the length and contour of the trip (data 215) ahead to the controller as well as continuously updating the controller with the current position. Standard interconnection methods such as Ethernet, USB, infra red, or wireless Ethernet, for example, can be used to communicate between the devices. Alternatively, a dedicated GPS chipset can be associated with the controller. Given the availability of this information, more sophisticated control algorithms can be used.

In the hill example given above, the algorithm can calculate the amount of energy that could be recovered given the contour of the road ahead. If the future path is downhill, that may override the requirement to keep the battery charged to a certain level, thus maximizing efficiency.

If the driver changes the route, this will cause the vehicle's battery to be in a non optimal state; for instance if at the top of the slope posited above, the driver were to leave the programmed route and take a detour that leads further uphill, that driver might be informed that either the speed will be restricted or the vehicle must park while the conventional engine recharges the battery. This may be a worst case cost of the efficiency improvements. If the driver were to begin a trip without indicating a destination to the GPS, the controller might default to the current style of algorithm. The only cost of doing this would be a loss of efficiency; otherwise the vehicle would operate normally.

In the example of the plug-in hybrid approaching its destination described above, the controller could use the current position forwarded by the GPS as well as the information on the distance to the destination and contour of the road ahead to model the energy required to complete the trip. At the moment the computed energy necessary to complete the trip is less than the current energy stored in the battery, the controller could stop using the engine to charge the battery and let it discharge (obviously keeping some minimal reserve level) so that it could accept the maximum charge from the grid recharge point.

A simple form of this optimization could be achieved by giving the driver a control to inhibit further recharging of the battery by the engine. A driver who was familiar with the route could learn when they could activate the switch to optimize use of battery charge. It could become possible to over-drain the battery, but with an attentive driver on a familiar route this would be feasible and would increase efficiency without any modification to the existing controllers.

For the automatic anticipation optimization to work properly, the controller would need to know whether the destination had grid charging available. This information can be available to the controller as a data item on the GPS. In most GPS/electronic map units, the user can have the GPS remember locations and can give the locations (called waypoints) names and in some cases choose a symbol. This may be used to define grid points. Grid points can also be added as "points of interest". In this method when the driver enters waypoints into the integrated GPS they would indicate whether grid based battery charging was reliably available at each waypoint. When the driver started a trip they would enter the destination waypoint. In this case the control algorithm would know not only the distance and contour to be crossed to get to the destination but whether less expensive recharge for the battery is available. Given this information, the control algorithm could use the engine as little as possible to arrive with some minimal charge in the battery.

If the driver were to input the destination for the next trip and when they expected to start when they leave the vehicle further optimizations are possible. Consider the examples of the plug-in hybrid which is parked overnight. If the driver enters the time they next expected to derive and the controller had access to data on electricity rates, it might calculate that rates would go lower before the time the driver next needed the car and therefore the optimum behavior might be to delay fully recharging the battery until rates go down. For pure hybrids which cannot be used at all if the battery is discharged, the algorithm might be modified to require bringing the battery up to some minimal charge (for instance enough to get to the nearest hospital) as quickly as possible and then doing the rest of the charging during off peak rates.

Knowledge of the time before the vehicle would be next used and the next destination might also improve the optimization algorithms for solar hybrids. Consider the example of the solar hybrid that has just been parked, if the user indicates that the next trip will occur in a short time and will be a long trip the algorithm might dictate recharging the battery right away from grid power even though it is more expensive than sunlight. On the other hand if the user indicates that they will not use the vehicle for 8 hours or the next trip is to another location which also has charging and which the vehicle can reach with the current charge then the control algorithm might conclude that recharging with solar alone is the optimum choice.

Other optimization information may be used as 200. The dynamic information includes information that changes from time to time. The amount of traffic on the road serves as an indication of the probable fuel economy. This data allows more accurately estimation of the energy needed to complete the trip.

Another input is weather, the current and future wind speed and direction along the route will exert a non-trivial effect on energy needed, in addition the future cloud cover is a variable the control algorithm should have in order to decide whether a solar hybrid will be able to recharge from sunlight in the time available.

Future speed can also be used to optimize performance. In certain jurisdictions, real time information on the current average speed of travel for each segment of the local highways is now on the web. This information may be used as part of the model. The data could be distributed in computer readable form such as XML or RSS. If it were, a vehicle equipped with a wireless internet connection could continuously download this information and the control algorithm would be able to estimate future speed as well as distance and hills in optimizing the use of power sources. An internet connection could also be used to download weather forecasts in order to have anticipated wind speed and direction as an input. For the optimization of charging by a Solar Hybrid as described above knowledge of the future cloud cover would be a needed input.

Another embodiment uses stop information as part of the optimization scenario. The stops that a driver plans on making, as well as the estimated time at each waypoint can be used. The controller algorithm may use this information to check that time to charge the battery will be available at a charging waypoint, if not it might still do some charging with the engine. The stops can also be used with solar hybrids, to determine the amount of time for solar charging.

This same information on future use could be used to minimize pollution as well. It is a known property of catalytic converters that they do not work well until they become hot. It has been proposed that as a vehicle is started battery power be used in resistive heating elements to bring the converter up to temperature as quickly as possible in order to minimize pollution caused by short trips. In a plug in hybrid which is trying to maximize the use of the battery the use of electricity to heat something is a poor use of a limited resource. If the driver enters the time the vehicle would next be used when they plug in, the controller could start warming the catalytic converter while the vehicle is still connected to grid power. This would allow the vehicle to start a trip with the battery fully charged and the catalytic converter at optimum temperature.

Another embodiment uses a remote control with which the driver could instruct the controller a few minutes before they leave to activate a preparation sequence which would bring the battery to full charge and heat the catalytic converter.

Another alternative is that the controller more aggressively draws from the battery until the catalytic converter is heated, thereby reducing engine operation and hence reducing engine exhaust via the un-optimized catalytic converter. In this embodiment, the battery use during times of cool catalytic converter is more aggressive than during other times. This is shown generically as 230 in the flowchart.

The control algorithms mentioned above assume that the energy needed to move the vehicle a given speed on a given slope is known. One way of deriving this information is to perform experiments during the design of the vehicle and program the factors so discovered into the controller. If the user is entering the destination into a GPS which is available to the controller more customizable algorithms are possible. The control algorithm could as a side effect of its operation store the energy used for each segment of a trip recording the speed and slope along with the energy used. This data could be averaged and consulted by the algorithm when it needed to compute the energy needed to complete a given trip as described above. The advantage of this method is that the vehicle would in effect learn the driver's habits and the efficiency of the vehicle as it changed over time. Another way to store and use this data would be to record the energy used on each trip averaging trips between the same waypoints together. Most vehicles make the same trips repeatedly so if the driver's input to the GPS indicated a trip for which there were prior records the energy used on the prior trips could be used as an estimate of the energy needed to complete this trip. The advantage of this is again the customization that would occur as the vehicle in effect learned the driver's habits and the local weather and traffic. Further optimization could be achieved by sorting trips by time of day and weather and choosing the historical trips most similar to the proposed trip as the model. This is analogous to the precedent method of weather forecasting.

If the database of previous trips between the same waypoints is large enough the control algorithm would have a higher degree of confidence in the estimated future energy consumption. In this case the controller could compute a confidence factor and could adjust the minimum battery charge to keep based on this factor. That is if the controller has a high degree of confidence in the projected energy use it would allow the battery to discharge to a lower level during the trip. If an adaptive algorithm such as this were used the vehicle would be more efficient on familiar trips. The same applies to projections based on knowledge of the route and the anticipated slopes, traffic and weather. If there is a large database of similar situations the controller could have a higher degree of confidence in the calculated energy requirements.

Another way to have a larger database either of specific trips or performance in various situations is to share with other users of the same type of car. A web based subscription service could be offered in which, the controller uses a wireless internet connection (or any other method of real time communication) to upload the actual energy usage experience on whatever trips it takes. In return controllers belonging to registered users of the site could download information to make better predictions for upcoming trips either examples of the same trip or general data on the energy usage of cars of that model under various conditions of slope speed weather etc.

It should be obvious that other methods of communication could be used to achieve this result including exchanging data before and after trips when non wireless methods are available.

In summary of the above techniques, 235 determines the energy for the remainder of the trip, based on the GPS data. 240 determines the total future motor run time, and 245 allows distributing that run time over the trip.

FIG. 3 illustrate a "parked" flowchart. As described above, this allows obtaining the time and destination of the next trip at 300, determining the energy that is needed for later driving at 305, and then charging at 310.

The general structure and techniques, and more specific embodiments which can be used to effect different ways of carrying out the more general goals are described herein.

Although only a few embodiments have been disclosed in detail above, other embodiments are possible and the inventor(s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, while the above has referred to certain kinds of hybrids, it may be usable with others also. Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose

The invention claimed is:

1. A hybrid vehicle, comprising:
a battery;
a motor, operating from power stored in said battery;
a GPS navigator, that stores future trip information and provides output information about said future trip information; and
a controller, including a monitoring port, which monitors a state of charge of the battery, and also receives information from said GPS navigator, and controls how much energy is received by and delivered by said battery, based on both of said state of charge of said battery, and said information, and also controls, at a current time, an amount of charging of the battery, based on said future trip information, whereby based on at least one item of future trip information causes said battery to be charged by less than a maximum charging amount.

2. A vehicle as in claim 1, wherein said controller determines a contour of a road ahead that will be traveled, based on said information, and uses said contour to determine an amount of charge to be delivered.

3. A vehicle as in claim 1, further comprising a catalytic converter, and said controller detects a temperature of said catalytic converter, and uses said temperature to determine energy delivery by said battery.

* * * * *